(12) United States Patent
Ikeda

(10) Patent No.: US 6,962,241 B2
(45) Date of Patent: Nov. 8, 2005

(54) BRAKE CABLE CONNECTING APPARATUS FOR A DRUM BRAKE DEVICE

(75) Inventor: Takashi Ikeda, Owariasahi (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 10/777,738

(22) Filed: Feb. 12, 2004

(65) Prior Publication Data

US 2004/0159506 A1  Aug. 19, 2004

(30) Foreign Application Priority Data

Feb. 12, 2003   (JP)  ............................. 2003-034231

(51) Int. Cl.[7] ........................ F16D 65/22; F16D 65/16; F16D 65/18
(52) U.S. Cl. ..................... 188/2 D; 74/502.6; 188/78; 188/328
(58) Field of Search .................... 188/2 D, 78, 325, 188/106 A, 106 F, 328; 74/501.5 R, 502.2, 74/502.4, 502.5, 502.6

(56) References Cited

U.S. PATENT DOCUMENTS

| | | | |
|---|---|---|---|
| 6,581,729 B1 * | 6/2003 | Moriwaki | 188/2 D |
| 6,715,378 B1 * | 4/2004 | Nakao | 74/502.6 |
| 2001/0017245 A1 * | 8/2001 | Komoda et al. | 188/72.9 |
| 2002/0117367 A1 * | 8/2002 | Ikeda | 188/325 |
| 2002/0185341 A1 * | 12/2002 | Ikeda et al. | 188/105 |

FOREIGN PATENT DOCUMENTS

| | | | |
|---|---|---|---|
| JP | 252040 | | 9/1996 |
| JP | 10220506 A | | 11/1998 |
| JP | 2001234957 A | | 4/2000 |
| JP | 2001-234957 | * | 8/2001 |
| JP | EP001447586 A2 | * | 8/2002 |
| JP | EP001447586 A3 | * | 11/2004 |

* cited by examiner

Primary Examiner—Douglas C. Butler
(74) Attorney, Agent, or Firm—Apex Juris, pllc; Tracy M Heims

(57) ABSTRACT

A cable disengagement prevention configuration for a drum brake device that provides a simple and safe connection of a brake cable to a brake lever and reliably prevents disengagement of the brake cable after connecting the brake cable to the brake lever. The cable disengagement prevention configuration mainly comprises a bowfront portion (18f) of the brake lever (18) and a brake shoe (11). The bowfront portion (18f) is formed between a primary seating (18e) and a secondary seating (18g) and is positioned apart from the primary seating (18e) at an opening side of a U-shaped groove (18d). The cable disengagement prevention configuration allows a cable end fitting (28) to pass through a gap between the brake lever (18) and the brake shoe (11) only when rotating the brake lever (18).

4 Claims, 8 Drawing Sheets

BRAKE CABLE CONNECTING APPARATUS FOR A DRUM BRAKE DEVICE

BACKGROUND OF INVENTION

1. Field of the Invention

This invention relates to a mechanical type drum brake device and more particularly to a brake cable connecting apparatus for a drum brake device with an improvement at a connecting section between a brake lever and a brake cable.

2. Description of Related Art

A known conventional mechanical type drum brake device is such that an inner cable of a brake cable is retained in a U-shaped groove which is formed at a free end of a brake lever and that a cable end fitting fixed on one end of the inner cable is seated on an edge surface of the U-shaped groove at a cable release side.

In the conventional mechanical type drum brake device, a cable disengagement prevention configuration, which prevents the brake cable from disengaging from the brake lever after installing the drum brake in a vehicle and before adjusting the brake cable stroke, has a disengagement prevention means in a brake shoe where a portion of the shoe rim is cut and folded to form a projection, which restricts a movement of the brake cable relative to the brake lever. The conventional type is disclosed in Japanese utility model registration bulletin number 2520404 (pages 2–5, FIGS. 1–4).

OBJECTS AND SUMMARY OF INVENTION

The above-described drum brake device with the conventional cable disengagement prevention configuration has the following points to be improved.

A process of connecting the brake cable to the brake lever requires seating the cable end fitting on the edge surface of the U-shaped groove formed at the free end of the brake lever at the cable releasing direction side while rotating the brake lever. A spring force of shoe return springs acts on the brake lever, which requires a large force in order to rotate the brake lever in a cable operating direction.

Where the force causing the rotation of the brake lever is inadvertently released during the brake cable connecting process it is possible for the brake lever to snap back to an initial position due to the urging force of the shoe return springs. In this case there is risk of injuring fingers and/or a thumb by being caught between the brake lever and a web of the brake shoe.

In order to connect the brake cable to the brake lever the brake cable must be controlled under extremely adverse condition, i.e., passing the brake cable through a barely visible interstice between a back plate and the brake shoe. This creates poor work efficiency and requires skilled work.

Because of the poor work efficiency, a checking step is necessary for the conventional device to assure that the brake cable is reliably connected to the brake lever.

This invention is made to improve the above-described problems and the objects of this invention are to provide a brake cable connecting apparatus for a drum brake device which affords connection of the brake cable to the brake lever in a safe and simple manner and to reliably prevent disengagement of the brake cable after connecting the brake cable to the brake lever.

In order to attain the above-objects, this invention provides the brake cable connecting apparatus for the drum brake. The brake cable connecting apparatus for a drum brake device, may comprises a brake lever, a proximal portion thereof is superposed and pivotally supported on a brake shoe so as to move at least one brake shoe outwardly, a U-shaped groove is formed in a distal portion thereof, and a primary seating is provided around a bottom of the U-shaped groove at a cable release side so as to face a shoe rim of the brake shoe; and a brake cable, an inner cable thereof is received into the U-shaped groove, and a cable end filling thereof, fixed on one end of the inner cable, is seated on the primary seating, wherein a secondary seating, on which the cable end fitting is temporarily seated, is provided around an opening of the U-shaped groove of the brake lever at the cable release side and also provided at a portion apart from the primary seating so as to face the shoe rim of the brake shoe; and a cable disengagement prevention configuration is provided between an intermediate portion of the brake lever that is located between the primary seating and the secondary seating, and the brake shoe, the cable disengagement prevention configuration allows the cable end fitting to pass from the secondary seating to the primary seating only when the brake lever is rotated but prevents the cable end fitting from passing from the primary seating to the secondary seating when the brake lever is not rotated.

The cable connecting apparatus for the drum brake device as above may have the cable disengagement prevention configuration that is composed of the brake lever and the shoe rim of the brake shoe.

The cable connecting apparatus for the drum brake device as above may have the primary seating and the secondary seating of the brake lever that are together formed in a step-like surface.

According to the above-mentioned brake cable connecting apparatus for the drum brake device, the brake lever does not need to directly be rotated manually by hand or with tools to connect the brake cable. This invention allows the brake cable to connect to the brake lever simply by pulling the inner cable in a state of temporarily seating the cable end fitting on the secondary seating of the brake lever, which improves the work efficiency and the reliability of the brake cable connection.

The cable disengagement prevention configuration prevents the cable end fitting from traveling back between the primary and the secondary seatings after connecting the brake cable to the brake lever, which reliably prevents the brake cable from being disengaged from the brake lever.

The cable disengagement prevention configuration is composed of the brake lever and the brake shoe, especially the brake lever and an inner surface of the shoe rim, which simply realizes the configuration. The primary seating and the secondary seating of the brake lever are together formed in a step-like surface, which extends the usability. Furthermore, the cable end fitting impinges on the primary seating, and therefore, an impinging sound and assembler's sense give assurance of connection between the brake cable and the brake lever.

EMBODIMENT OF THE INVENTION

Referring to FIGS. 1–6, one embodiment of the brake cable connecting apparatus for the drum brake device as disclosed in this invention will be explained. Terms, "upper", "lower", "right" and "left" in a description below refer to "upper", "lower", "right" and "left" in FIG. 1 unless specifically stated otherwise.

Figure 1:
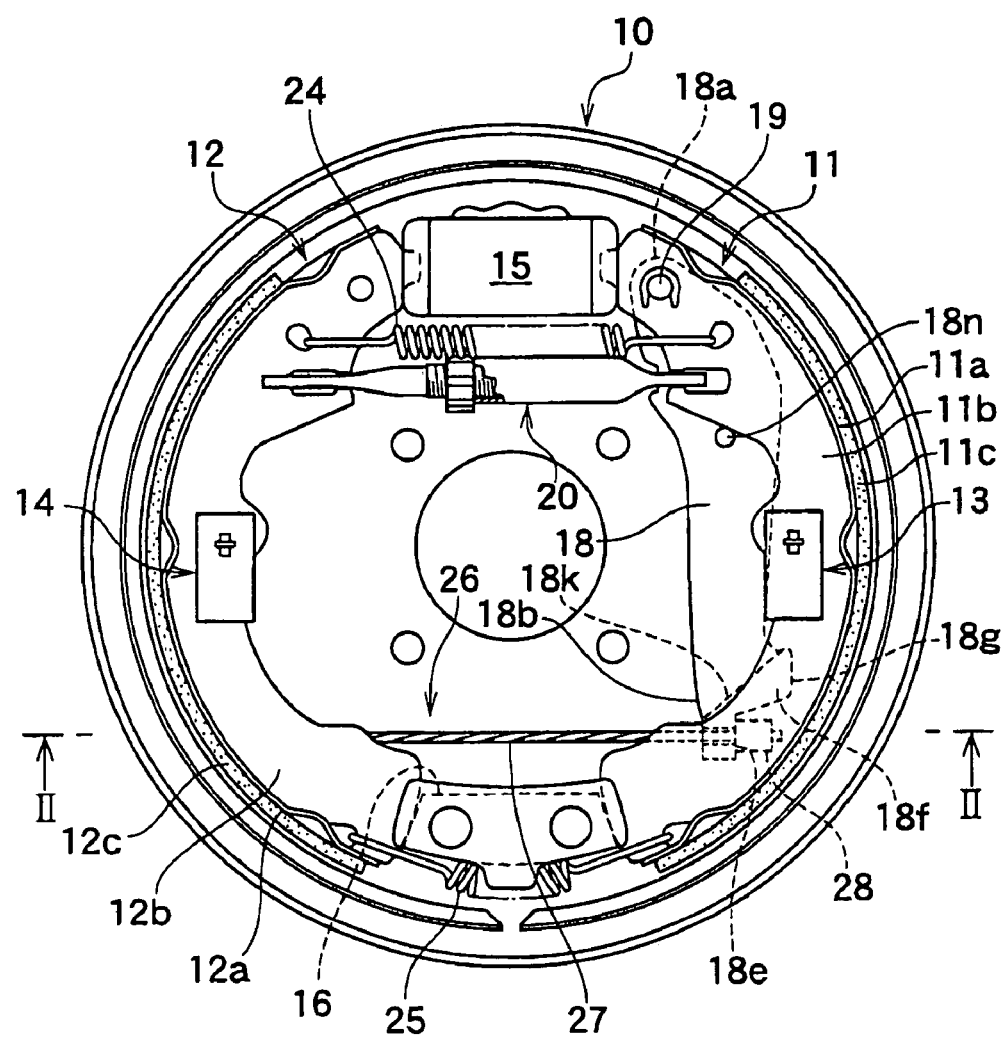
FIG. 1 is a plan view of the mechanical type drum brake device of this invention.
Figure 2:
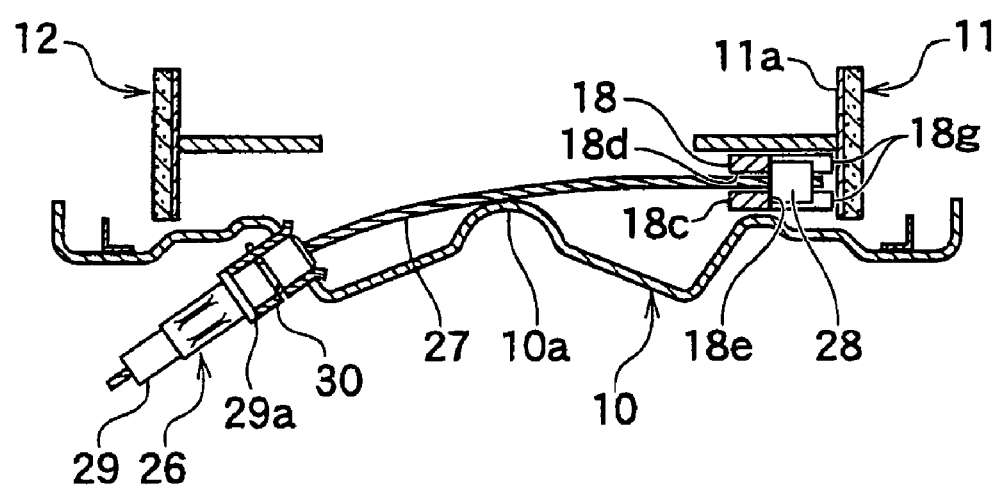
FIG. 2 is a cross sectional view of FIG. 1 taken along the line II—II.

FIG. 1 shows a plan view of a leading-trailing type drum brake device.

A pair of facing brake shoes 11, 12 are comprised of shoe rims 11a, 12a and shoe web 11b, 12b and each of the brake shoes 11, 12 is cross-sectionally formed in a T-shape. Linings 11c, 12c are fixed on the peripheral surfaces of the shoe rims 11a, 12a respectively. The brake shoes 11, 12 are slidably retained on a back plate 10, which is fixed on a stationary part of a vehicle, by means of shoe hold mechanisms 13, 14 respectively.

Upper adjacent ends of the shoe webs 11b, 12b functionally engage with a wheel cylinder 15 fixed on the back plate 10 while lower adjacent ends of the shoe webs 11b, 12b are supported by an anchor block 16, also fixed on the back plate 10.

A plate-like brake lever 18 is superposed on the back plate, side surface, of the right shoe web 11b, and a proximal end 18a is pivotally supported by a pin 19 around an upper side of the shoe web 11b. A stopper 18n projects from a non-back plate side surface of the brake lever 18 between both ends of the brake lever 18 and abuts against the inner circumference of the shoe web 11b, thereby restricting the counterclockwise rotation of the brake lever 18 in the cable releasing direction.

A shoe clearance adjustment strut 20, one of the components constituting a parking brake mechanism, is provided adjacent to the wheel cylinder 15, and is extended between the shoe web 12b of the left brake shoe 12 and the brake lever 18.

Shoe return springs 24, 25 are stretched between both brake shoes 11 and 12, which urge both brake shoes 11 and 12 toward each other. The shoe clearance adjustment strut 20 restricts the initial positions of the brake shoes 11, 12.

A brake cable 26 is comprised of an inner cable 27, a cable end fitting 28, and an outer casing 29.

A brake side of the inner cable 27, slidably provided in the outer casing 29, is smoothly guided in an appropriate direction by a protrusion 10a formed on the back plate 10, and the cable end fitting 28, fixed on an end of the inner cable 27, is seated on a primary seating 18e of the brake lever 18.

A casing cap 29a, fixed on a brake side end of the outer casing 29, is attached onto a pipe 30 fixed on the back plate 10.

The other side of the inner cable 27 is connected to a parking brake operating lever in a driver's compartment, which is located outside of the figures. The other side of the outer casing 29 is fixed to the vehicle body, which is also located outside of the figures.

Figure 3:
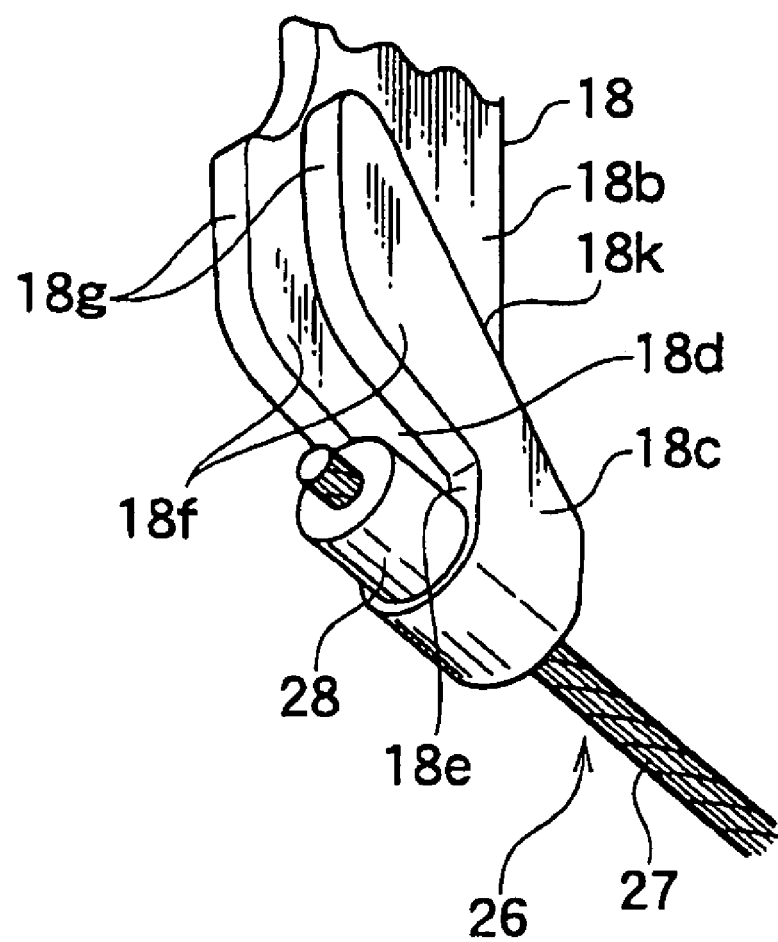
FIG. 3 is a partial perspective view of the connecting section between the brake lever and the brake cable viewed from the back plate side.
Figure 4:
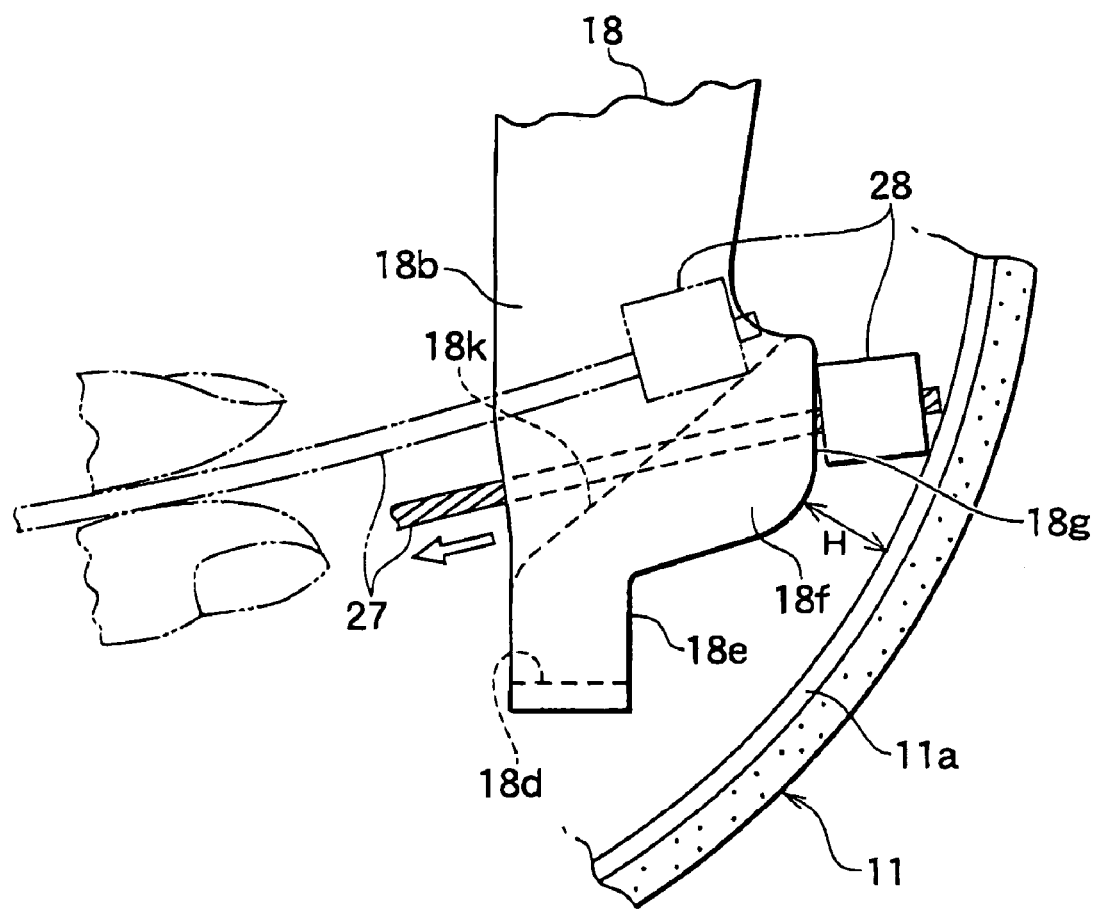
FIG. 4 is a view illustrating the connecting process of the brake cable where the cable end fitting is guided onto the secondary seating.

FIG. 3 illustrates a connecting section between the brake lever 18 and the brake cable 26 as viewed from the back plate side. FIG. 4 illustrates a condition where the cable end fitting 28 is being guided to a secondary seating 18g. Referring to FIGS. 3 and 4, a connecting mechanism, the structure of the brake cable 26 and the brake lever 18 is explained. The brake lever 18 has a folded section 18c at the free end 18b facing the back plate 10, where the folded section 18c, together with a main body of the brake lever 18, makes a U-shaped groove 18d for retention of the inner cable 27.

The brake lever 18, at the free end 18b, has the primary seating 18e whereat the cable end fitting 28 abuts and is seated on an edge surface thereof at the cable releasing direction side and has bowfront portions 18f protruding from the primary seating 18e in the cable releasing direction.

The brake lever 18, upper right of the bowfront portions 18f, also has the secondary seating 18g on which the cable end fitting 28 is seated in order to establish engagement with the brake lever 18. The secondary seating 18g is arranged so that a gap between the shoe rim 11a and the facing surface of the bowfront portion 18f allows the cable end fitting 28 to enter the gap at an entrance side but prevents it from passing therethrough at an exit side labeled as H in FIG. 4. More precisely, the gap is configured to allow the cable end fitting 28 to pass therethrough only when the brake lever 18 is slightly rotated.

As is evident from the above-description, the cable disengagement prevention configuration of this embodiment that prevents the cable end fitting 28 from disengaging from the brake lever 18 after assembling the brake cable 26, is comprised of the inner surface of the shoe rim 11a of the brake shoe 11 and the bowfront portion 18f positioned between the secondary seating 18g and the primary seating 18e. A minimum requirement is that the cable disengagement prevention configuration, which prevents the cable end fitting 28 from passing through the gap only when the brake lever is rotated, is provided between the primary seating 18e and the secondary seating 18g.

A ramped, guiding surface 18k, at an upper marginal end of the folded section 18c, is designed to guide the cable end fitting 28 thereon. This is not a prerequisite of this invention however.

Figure 5:
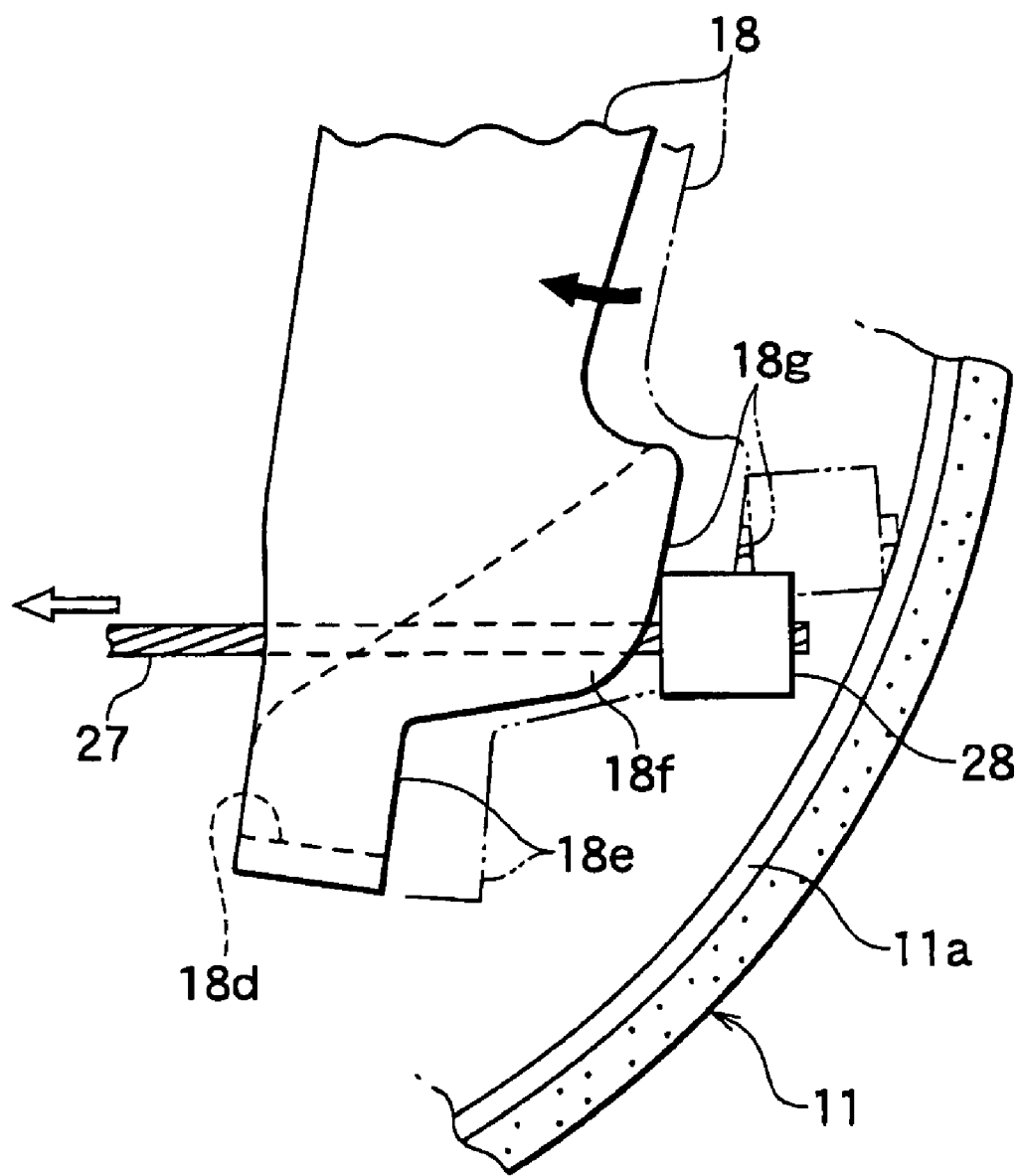
FIG. 5 is a view illustrating the connecting process of the brake cable where the cable end fitting is guided onto the primary seating while rotating the brake lever.
Figure 6:
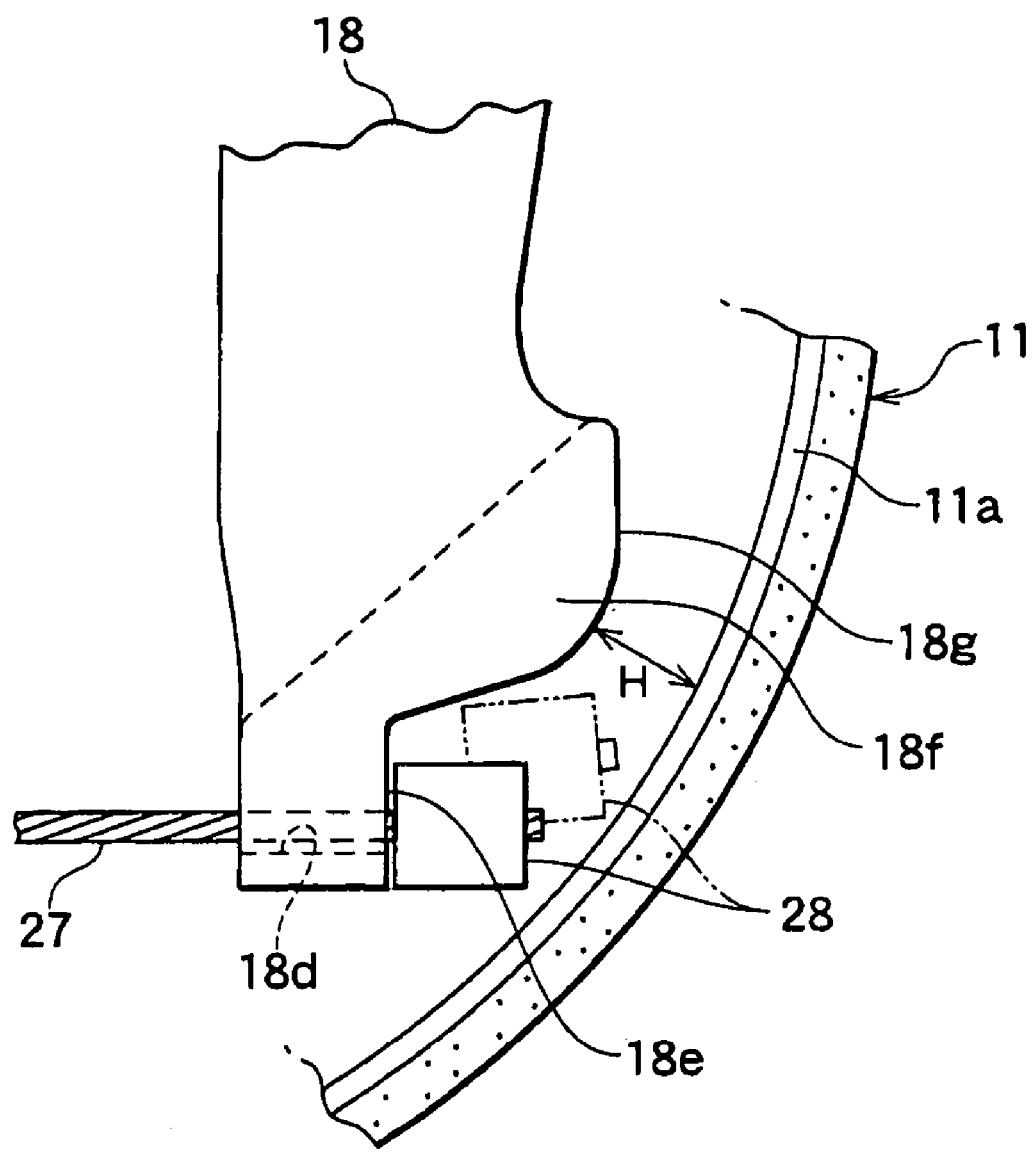
FIG. 6 is a view illustrating the brake cable where the cable end fitting was guided onto the primary seating and the connection was completed.

Referring to FIGS. 4–6, the connecting operation of the brake cable 26 to the brake lever 18 will be explained next.

As shown in a two-dot chain line of FIG. 4, while the assembler is pinching the inner cable 27 near the cable end fitting 28, the cable end fitting 28 is pushed toward the cable releasing direction side of the U-shaped groove 18d along the upward ramped guiding surface 18k. After reaching the top of the upward ramped guiding surface 18k, the end surface of the cable end fitting 28 drops into place to be engaged with and is seated on the secondary seating 18g.

When the inner cable 27 is pulled while the cable end fitting 28 is being seated on the secondary seating 18g, the cable end fitting 28 slides along the downward ramped surface of the secondary seating 18g and the bowfront portion 18f whereafter the cable end fitting 28 reaches the primary seating 18e.

The minimum distance H between the bowfront portion 18f and the inner surface of the shoe rim 11a is configured so that the cable end fitting 28 is prevented from passing through the gap while the brake lever 18 is not being rotated. When the cable end fitting 28 passes through the gap between the bowfront portion 18f and the inner surface of the shoe rim 11a, the brake lever 18 in the initial position, as shown in the two-dot chain line of FIG. 5, rotates in the cable operating direction, as shown by the solid line.

As shown in FIG. 6, after the cable end fitting 28 passes through the gap between the bowfront portion 18f and the inner surface of the shoe rim 11a, the inner cable 27 is received into the U-shaped groove 18d, and the cable end fitting 28 abuts against, and is seated on, the primary seating 18e.

After the cable end fitting 28 passes through the gap and as the brake lever 18 returns to the initial position, the distance between the bowfront portion 18f and the inner surface of the shoe rim 11a returns the initial minimum distance H.

Accordingly, even if an external force, in the cable releasing direction, is acted on the inner cable 27, travel of the cable end fitting 28 is interfered with by the cable disengagement prevention configuration, comprised of the bowfront portion 18f and the inner surface of the shoe rim 11a, thereby preventing the inner cable 27 from popping out from the U-shaped groove 18d and assuring cable end disengagement prevention.

Here, the parking brake operation is common and publicly known, the explanation of which is omitted.

This invention is not limited to what is described in the previous embodiment. This invention may be employed where, even if the brake lever 18 is superposed on a shoe web surface of the brake shoe 11, opposite to the previous embodiment, and the folded section 18c, formed on the free end 18b, is bent in a direction away from the shoe web 11b.

Figure 7:
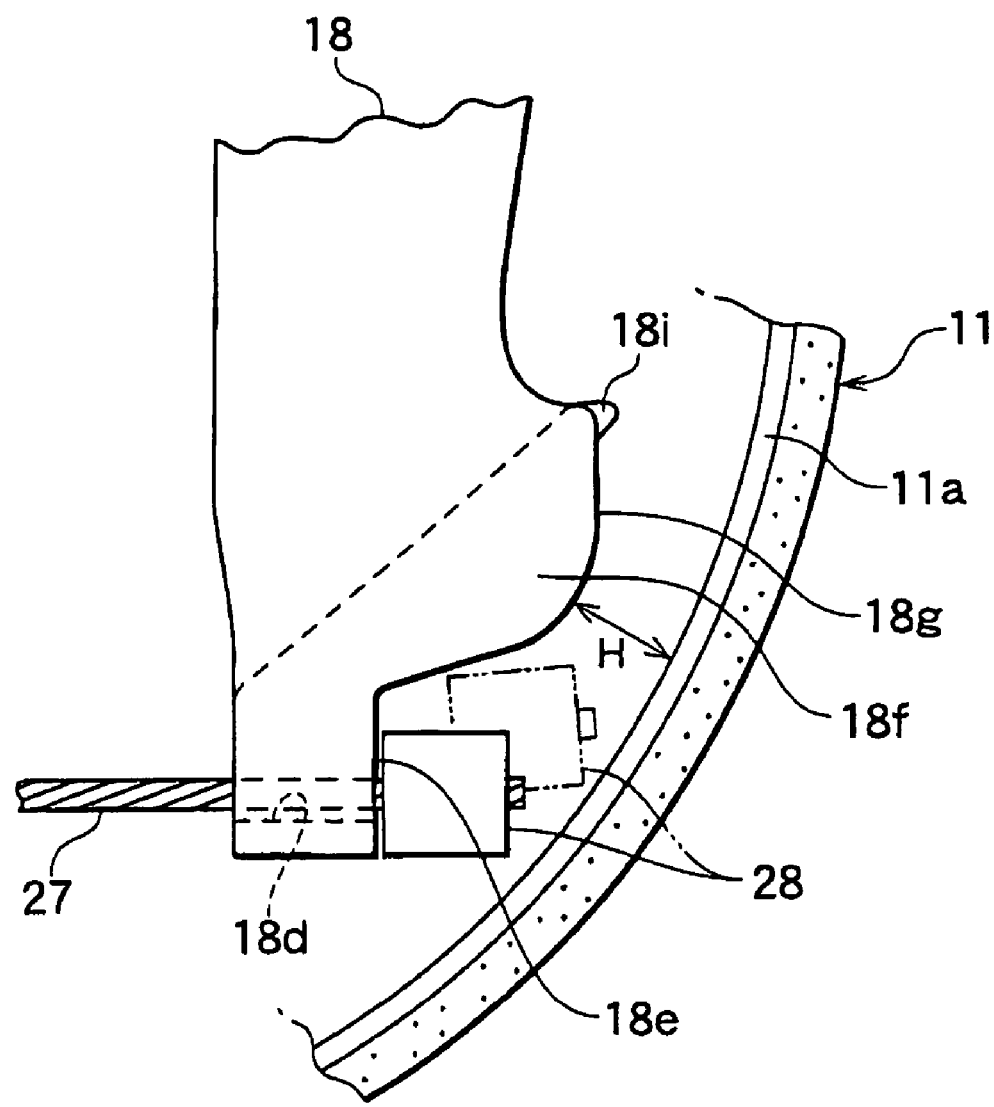
FIG. 7 is a partial plan view of the connecting section of another embodiment where the projection is provided at the end of the secondary seating.

Additionally, as shown in FIG. 7, if a protrusion 18i is protruding from an upper part of the secondary seating 18g toward the cable releasing direction, the cable end fitting 28, seated on the secondary seating 18g, abuts against the protrusion 18i regardless of any irregularity in the angle of inner cable 27 as it is being pulled, which prevents the cable end fitting 28 from disengagement from the primary seating 18e and certainly improves the connection between the brake cable 26 and the brake lever 18.

Figure 8:
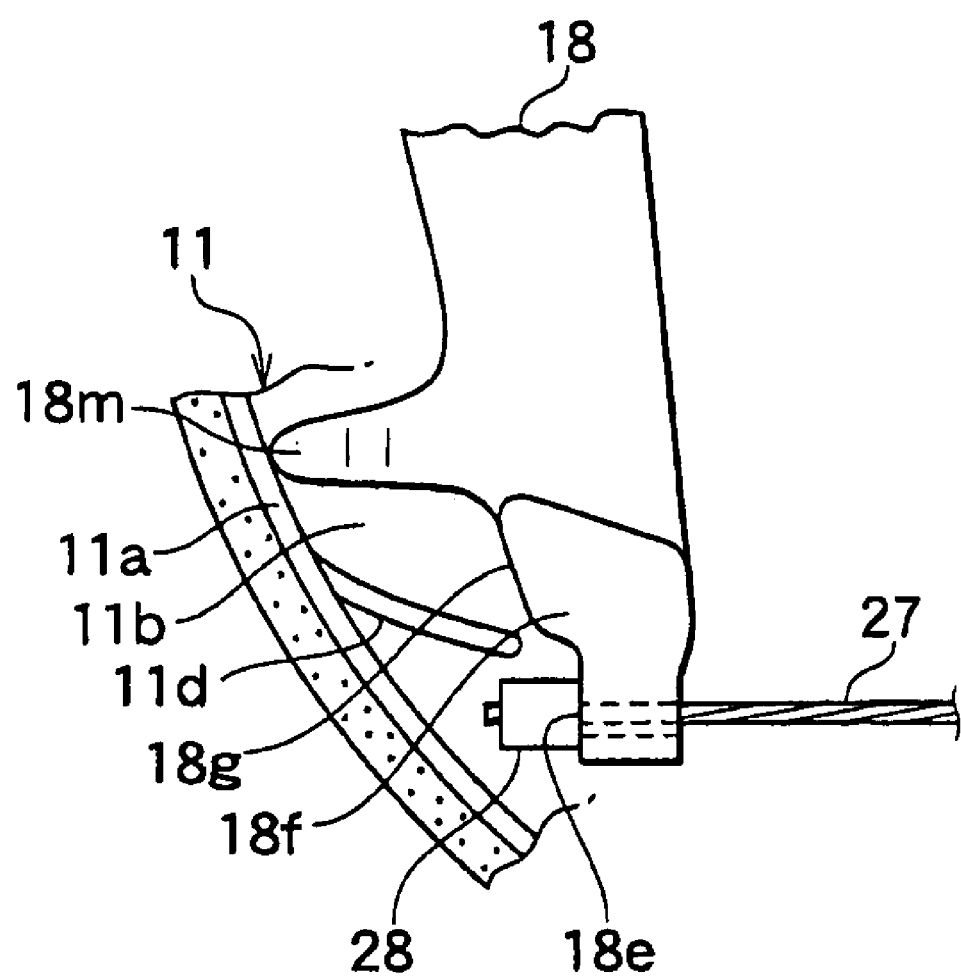
FIG. 8 is a partial plan view of the connecting section of another embodiment where the projection is formed on the brake shoe.

As shown in FIG. 8, the shoe rim 11a of the brake shoe 11, facing the bowfront portion 18f between the secondary seating 18g and the primary seating 18e, may be cut and folded to form the projection 11d, and the cable disengagement prevention configuration may be comprised of the bowfront portion 18f and the projection 11d of the shoe rim 11a, thus preventing the disengagement of the cable end fitting 28 after assembly.

The projection 11d may be formed in various ways such as by cutting and folding a portion of the shoe web 11b or using an extra pin on the shoe web 11b of the brake shoe 11.

In this example, the minimum distance in the gap between the bowfront portion 18f of the brake lever 18 and atop of the projection 11d may be specified so that the cable end fitting 28 is prevented from passing therethrough while the brake lever 18 is not rotating. This arrangement eliminates a process of rotating the brake lever 18 by hand or with tool prior to assembly and facilitates the brake cable connecting work to the brake lever 18 by simply pulling the inner cable 27 as the cable end fitting 28 abuts against the secondary seating 18g. In addition to the bowfront portion 18f, the brake shoe 11 has the projection 11d, which increases the effectiveness of cable disengagement prevention after connecting the brake cable 26 to the brake lever 11.

The stopper 18m of the brake lever 18, restricting the return position of the brake lever 18 as it abuts against the inner surface of the shoe rim 11a, may be formed so that the cable end fitting 28 can be temporarily held in a pocket defined by the crank-shaped stopper 18m, the projection 11d and the secondary seating 18g, thereby improving the engagement of the cable end fitting 28 with the secondary seating 18g.

The projection, composed of the cable disengagement prevention configuration and cooperating with the bowfront portion 18f, may be formed in various ways, such as by protruding a portion of the back plate 11 or by placing an additional pin on the back plate 11, as long as the projection is located between the primary seating and the secondary seating.

There are various other ways to form the cable disengagement prevention configuration that are obvious in consideration of the disclosure herein. For example, a hooking portion of the shoe return spring, extending between the brake shoes, may be designed such that an end of the hooking portion may project from the shoe web. Here the projecting, hooking portion of the shoe return spring functions as the cable disengagement prevention configuration in cooperation with the brake lever 18.

Also, the type of the drum brake device in which this invention may be employed is not limited to the leading-trailing type. This invention is applicable to various other types of drum brake devices, such as a duo-servo type or a drum brake device without the wheel cylinder 15, specially designed for a parking brake.

This invention has the following advantages.

This invention provides cable disengagement prevention configuration by allowing the cable end fitting to pass through the gap between the brake lever and the shoe rim only while the brake lever is rotating. Therefore, only the simple process of pulling the inner cable, without directly rotating the brake lever by hand or with tools, is necessary in order to connect the brake cable to the brake lever safely and reliably.

After connecting the brake cable to the brake lever, the cable disengagement prevention configuration prevents the cable end fitting from traveling back, and passing through, the gap between the brake lever and the brake shoe, thereby reliably preventing the brake cable from disengaging from the brake lever.

If the cable disengagement prevention configuration is composed of the common brake shoe and the modified brake lever, no modification of the brake shoe is necessary, which eliminates the problems of increasing the production cost, decreasing the rigidity of the brake shoe because of forming the projection, and misassembly.

What is claimed is:

1. A brake cable connecting apparatus for a drum brake device, comprising:

a brake lever, a proximal portion thereof is superposed and pivotally supported on a brake shoe so as to move at least one brake shoe outwardly, a U-shaped groove is formed in a distal portion thereof, and a primary seating is provided around a bottom of the U-shaped groove at a cable release side so as to face a shoe rim of the brake shoe; and a brake cable, an inner cable thereof received into the U-shaped groove, and a cable end fitting thereof, fixed on one end of the inner cable, is seated on the primary seating, wherein a secondary seating, on which the cable end fitting is temporarily seated, is provided around an opening of the U-shaped groove of the brake lever at the cable release side and also provided at a portion apart from the primary seating so as to face the shoe rim of the brake shoe; and a cable disengagement prevention configuration is provided between an intermediate portion of the brake lever that is located between the primary seating and the secondary seating, and the brake shoe, the cable disengagement prevention configuration allows the cable end fitting to pass from the secondary seating to the primary seating only when the brake lever is rotated but prevents the cable end fitting from passing from the primary seating to the secondary seating when the brake lever is not rotated.

2. The cable connecting apparatus for the drum brake device according to claim 1, wherein the cable disengagement prevention configuration is composed of the brake lever and the shoe rim of the brake shoe.

3. The cable connecting apparatus for the drum brake device according to claim 1, wherein the primary seating and the secondary seating of the brake lever are together formed in a step-like surface.

4. The cable connecting apparatus for the drum brake device according to claim 2, wherein the primary seating and the secondary seating of the brake lever are together formed in a step-like surface.

* * * * *